United States Patent
Oshima

(10) Patent No.: US 8,907,765 B2
(45) Date of Patent: Dec. 9, 2014

(54) RFID TAG DETECTION METHOD AND SYSTEM

(75) Inventor: Hiroshi Oshima, Hyogo (JP)

(73) Assignee: Hewlett-Packard Development Company, L. P., Houston, TX (US)

(*) Notice: Subject to any disclaimer, the term of this patent is extended or adjusted under 35 U.S.C. 154(b) by 1753 days.

(21) Appl. No.: 11/963,982

(22) Filed: Dec. 24, 2007

(65) Prior Publication Data

US 2009/0160647 A1    Jun. 25, 2009

(51) Int. Cl.
- H04Q 5/22 (2006.01)
- G06K 7/10 (2006.01)
- G08B 21/02 (2006.01)
- G06K 7/00 (2006.01)

(52) U.S. Cl.
CPC .......... G06K 7/0008 (2013.01); G06K 7/10297 (2013.01); G08B 21/0244 (2013.01); G08B 21/0275 (2013.01)
USPC ...................................... 340/10.1; 340/572.1

(58) Field of Classification Search
USPC ......... 340/540, 500, 568.1, 572.1, 10.1–10.5, 340/5.92, 5.9, 5.1, 825
See application file for complete search history.

(56) References Cited

U.S. PATENT DOCUMENTS

| | | | |
|---|---|---|---|
| 5,528,232 A * | 6/1996 | Verma et al. | 340/8.1 |
| 5,726,630 A | 3/1998 | Marsh et al. | |
| 6,002,344 A * | 12/1999 | Bandy et al. | 340/10.2 |
| 6,150,921 A | 11/2000 | Werb et al. | |
| 6,195,006 B1 | 2/2001 | Bowers et al. | |
| 6,483,427 B1 | 11/2002 | Werb | |
| 7,023,341 B2 | 4/2006 | Stilp | |
| 7,035,818 B1 * | 4/2006 | Bandy et al. | 705/28 |
| 7,091,827 B2 | 8/2006 | Stilp | |
| 7,339,479 B2 * | 3/2008 | Nishimura | 340/572.1 |
| 7,525,437 B2 * | 4/2009 | Takeuchi et al. | 340/572.1 |
| 2002/0171534 A1 * | 11/2002 | Ashwin | 340/10.3 |
| 2005/0035849 A1 * | 2/2005 | Yizhack | 340/5.92 |
| 2005/0099295 A1 * | 5/2005 | Sakamoto et al. | 340/540 |
| 2007/0200693 A1 * | 8/2007 | Costes | 340/447 |
| 2009/0160647 A1 * | 6/2009 | Oshima | 340/572.1 |

* cited by examiner

*Primary Examiner* — Brian Zimmerman
*Assistant Examiner* — An T Nguyen

(57) ABSTRACT

An RFID tag detection method and system are described. The method comprises transmitting, in a predetermined area, a predetermined number of RFID tag request signals. The method also comprises determining that an RFID tag is positioned within the predetermined area based on a comparison of a count of zero or more received RFID tag response signals from the RFID tag with the predetermined number of RFID tag request signals.

18 Claims, 7 Drawing Sheets

RFID TAG DETECTION METHOD AND SYSTEM

BACKGROUND

Radio frequency identification (RFID) tags may be used to identify items to which the tags are affixed or embedded. RFID tags may be read without contact between a reader and the RFID tag. An electromagnetic signal transmitted to the RFID tag is received and a reply electromagnetic signal is transmitted from the RFID tag. Many inventory and security systems, to name a few, employ the use of RFID tags affixed to items.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
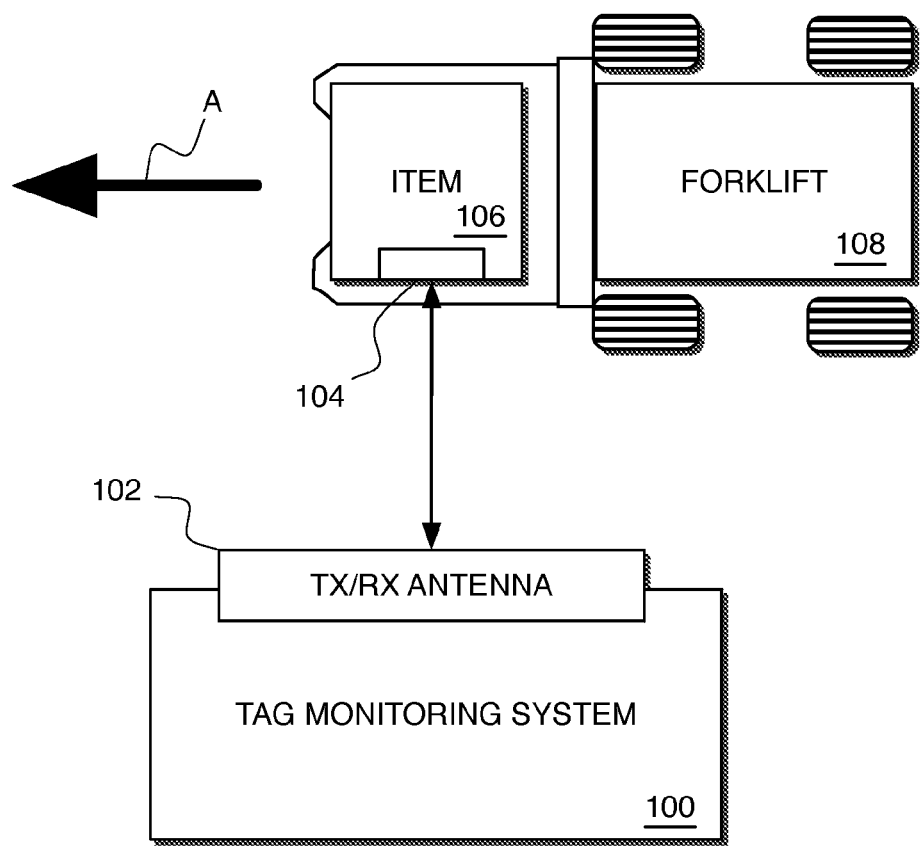
FIG. 1 is a high-level diagram of an installation and use of a tag monitoring system according to an embodiment.

FIG. 1 depicts a high-level diagram of an installation and use of a tag monitoring system (TMS) 100 according to an embodiment. TMS 100 comprises a transmit/receive antenna (TX/RX antenna) 102 which is positioned to communicate with a tag 104, i.e., a radio frequency identifier (RFID) tag affixed to an item 106. In at least some embodiments, tag 104 may be positioned within item 106, comprise a portion of the item, and/or be printed or imprinted thereon. Communication between TX/RX antenna 102 and tag 104 comprises transmission of one or more signals between the antenna and the tag. In at least some embodiments, the signals comprise electromagnetic signals, e.g., radio frequency signals.

RFID tag 104 comprises one or more circuits for receiving a radio-frequency-based tag identification request signal (tag request signal or tag request) and responding by transmission of a tag response signal (tag response). In at least some embodiments, tag 104 may be a passive, active, or semi-passive device. A passive tag 104 is powered based on the power of the incident tag request; an active or semi-passive device operates at least partially based on power provided to the tag beyond the power of the incident tag request, e.g., a battery or other power source. Tag 104 may be used for inventory, security, and other functions related to tracking one or more items.

As depicted in FIG. 1, a vehicle 108, e.g., a forklift, transports item 106 having tag 104 affixed thereon through an area adjacent TMS 100 and more specifically TX/RX antenna 102. For example, forklift 108 transports item 106 and tag 104 in a direction A past, i.e., generally perpendicularly to, the face of TX/RX antenna 102. In at least some embodiments, antenna 102 comprises an omnidirectional source and in some other embodiments, the antenna comprises one or more faces for generating a signal.

As tag 104 is moved past the antenna 102 of TMS 100, the TMS transmits the tag request which causes the tag to respond with the tag response indicating the presence of the tag to the TMS. That is, tag 104 generates and transmits the tag response signal responsive to receipt of the tag request signal. In at least some embodiments, tag 104 comprises a unique identifier with respect to other tags and the generated tag response signal comprises the unique identifier.

Figure 2:
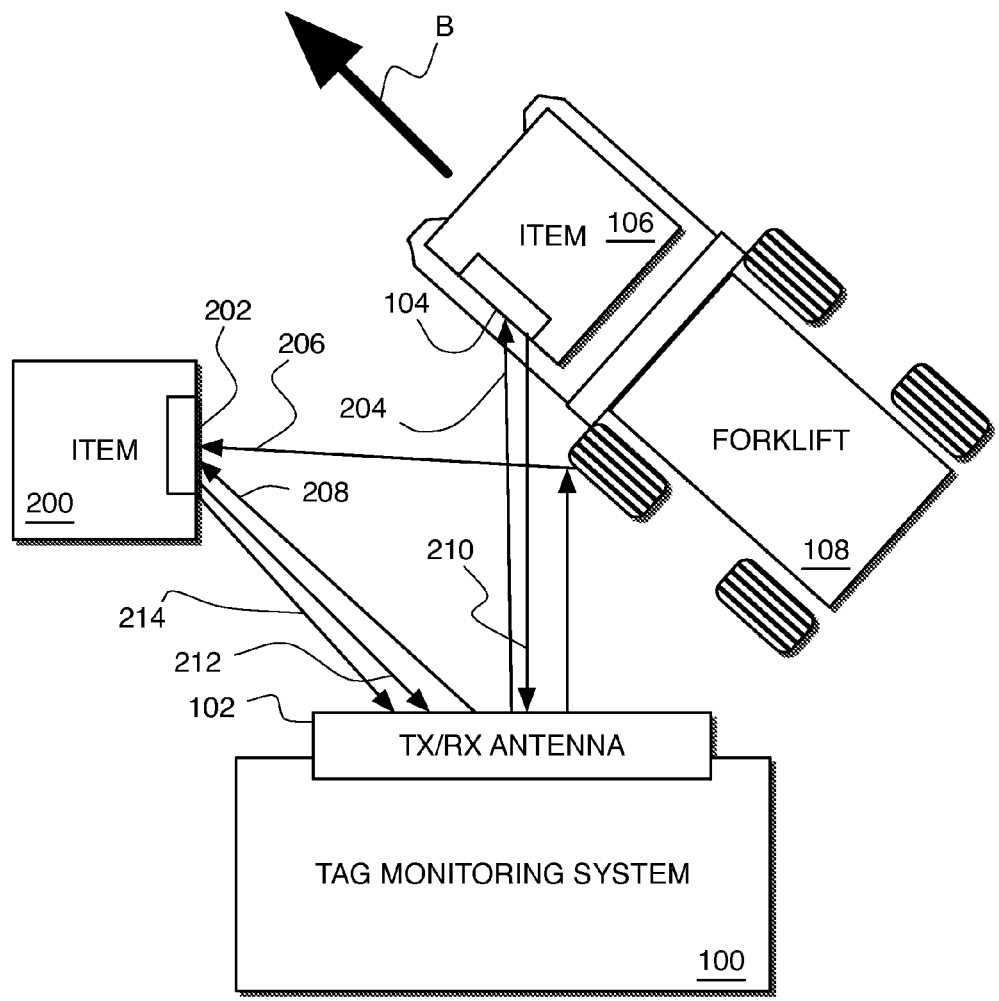
FIG. 2 is a high-level diagram of an installation and use of the tag monitoring system according to another embodiment.

FIG. 2 depicts the installation of TMS 100 in which vehicle 108 transports item 106 in a direction B past antenna 102 and a second item 200 having a tag 202 nearby the antenna. Direction B is at an angle to the face of antenna 102. For tracking purposes, it is desired that TMS 100 not obtain information regarding item 200 or tag 202. Item 200 and tag 202 are referred to as not of interest (NOI). Under nominal operating conditions, tag 202 is sufficiently far removed and/or positioned away from antenna 102 that either tag request signals generated by the antenna are not incident on the NOI tag or tag response signals transmitted by the NOI tag do not reach the antenna.

In operation, vehicle 108 triggers operation of TMS 100, e.g., by triggering a physical (e.g., a load- or contact-based mechanism) or non-physical (e.g., a photoelectric or other electromagnetic-based mechanism) switch. In at least some embodiments, the switch may comprise an integral part of TMS 100.

Responsive to vehicle 108 triggering TMS 100, the TMS causes antenna 102 to transmit the tag request (indicated by reference numerals 204, 206, and 208 toward the tag end of the connecting lines between the antenna and the tags). Tag request 206 arrives at NOI tag 202 indirectly by way of reflection off an object, e.g., vehicle 108 and/or item 106; tag request 206 may be referred to as an indirect tag request. Tag requests 204, 206, 208 comprise a signal transmitted from antenna 102 at a given time. In at least some embodiments, tag requests 204, 206, 208 comprise a single electromagnetic wave emitted from antenna 102.

Because indirect tag request 206 is incident on NOI tag 202 because of an indirect path, the time of arrival of the indirect tag request at the NOI tag may differ from the time of arrival of tag request 208 proceeding directly from antenna 102 to the NOI tag.

Tag 104 responds to tag request 204 by transmission of tag response 210 to antenna 102. Thus, tag 104 responds to a direct transmission of tag request from antenna 102.

Figure 7:
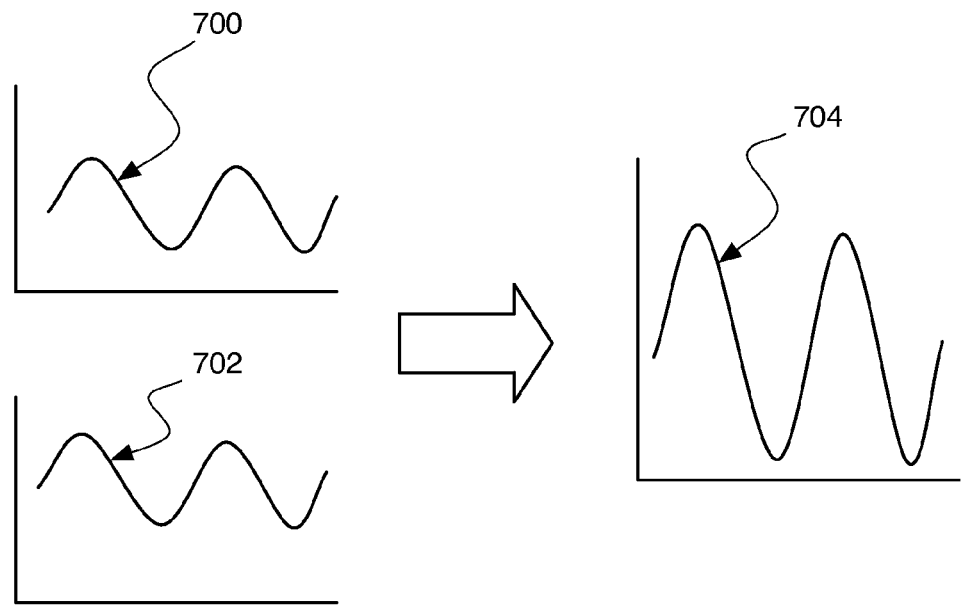
FIG. 7 is a representation of a multipath signal effect.
Figure 8:
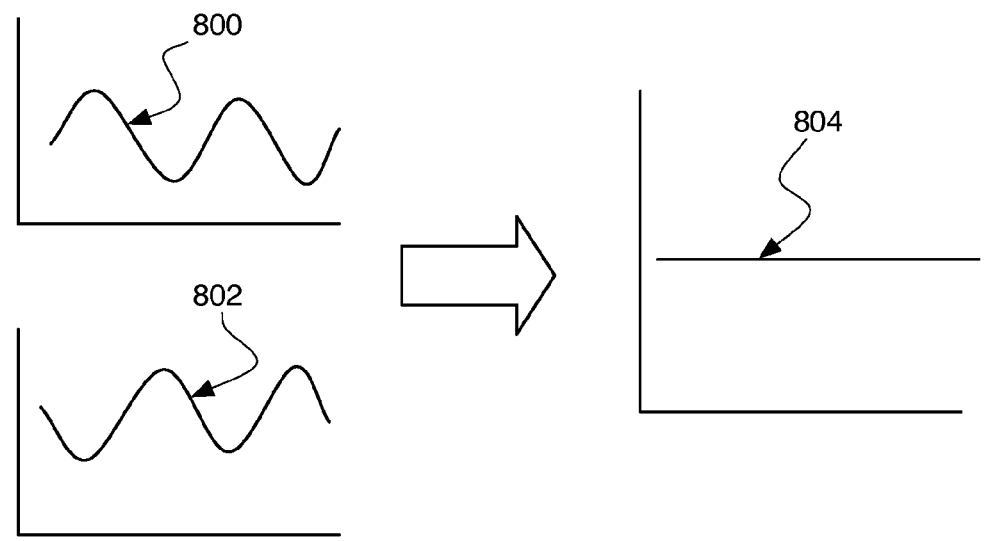
FIG. 8 is a representation of another multipath signal effect.

NOI tag 202 responds to tag request 208 by transmission of tag response 212 to antenna 102. NOI tag 202 also responds to indirect tag request 206 by transmission of a second tag response 214 to antenna 102. Because second tag response 214 results from the indirect tag request 206 there may be a delay between the transmission of tag response 212 and second tag response 214. In at least some embodiments, the delay between transmission of tag response 212 and second tag response 214 may be sufficient to cause the combined tag response signal, i.e., the result of combining the tag response and the second tag response, to be in a range from negligible level (in which antenna 102 is unable to receive a signal sufficient to receive the tag response) to a discernable level (in which the antenna is able to receive a tag response). Put another way, tag response 212 and 214 may be in-phase and additive in nature, thereby boosting the signal to a level detectable by antenna 102 (e.g., as depicted in the signal representations of FIG. 7) or the tag responses may be out-of-phase and destructive in nature, thereby canceling each other out and resulting in a signal of a level which is not detectable by the antenna (e.g., as depicted in the signal representations of FIG. 8). FIG. 7 depicts a representation of the constructive nature of signals as between a first signal 700 (e.g., tag response 212) overlapping with a second signal 702 (e.g., second tag response 214) to generate a resultant signal 704 incident at an antenna, i.e., antenna 102. FIG. 8 depicts a representation of the destructive nature of signals as between a first signal 800 (e.g., tag response 212) overlapping with a second signal 802 (e.g., second tag response 214) to generate a resultant signal 804 (e.g., no or a minimal signal) incident at an antenna, i.e., antenna 102. In at least some embodiments, tag response 212 and second tag response 214 may be in a range from in-phase to out-of-phase.

Based on the foregoing, as tag 104 is transported past antenna 102, indirect tag requests 206 reflected by vehicle 108 may cause tag 202 to transmit sufficient overlapping tag responses, i.e., tag response 212 and second tag response 214, that the antenna receives at least one tag response from NOI tag 202. In at least some embodiments, the tag response received from NOI tag 202 received as a result of the above is referred to as a spurious tag response.

Figure 3:
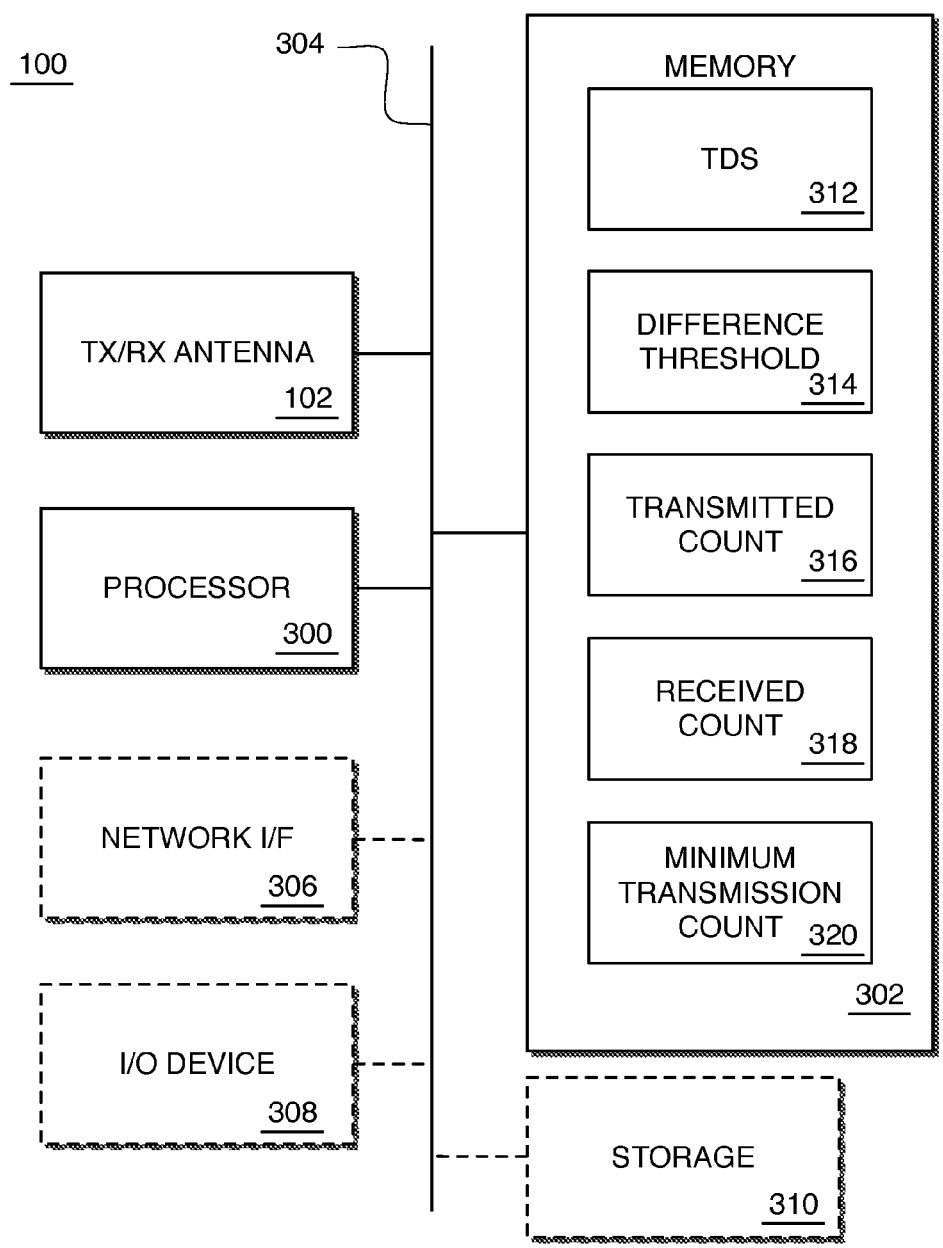
FIG. 3 is a high-level block diagram of the tag monitoring system according to an embodiment.

FIG. 3 depicts a high-level block diagram of TMS 100 according to an embodiment comprising antenna 102 communicatively coupled with a processor 300 and a memory 302 by a bus 304. Processor 300 executes one or more sets of instructions stored in memory 302 to cause TMS 100 to perform a method according to an embodiment. In at least some embodiments, TMS 100 also comprises a number of optional components, i.e., a network interface (I/F) 306, an input/output (I/O) device 308, and a storage component 310.

Network I/F 306 enables transmission to/from TMS 100 with other networked devices, e.g., a server for receiving inventory information based on received tag responses. I/O device 308 enables communication of information to a user and receipt of information and control signals from the user. Storage component 310 enables storage of information, control signals, and one or more contents of memory 302.

Memory 302 may comprise a static or dynamic storage component, e.g., a random access memory (RAM), a read only memory (ROM), or another medium from which one or more sets of instructions may be read by processor 300. Memory 302 comprises a tag detection system 312, a predetermined difference threshold 314, a transmitted count 316, a received count 318, and a minimum transmission count 320.

Figure 4:
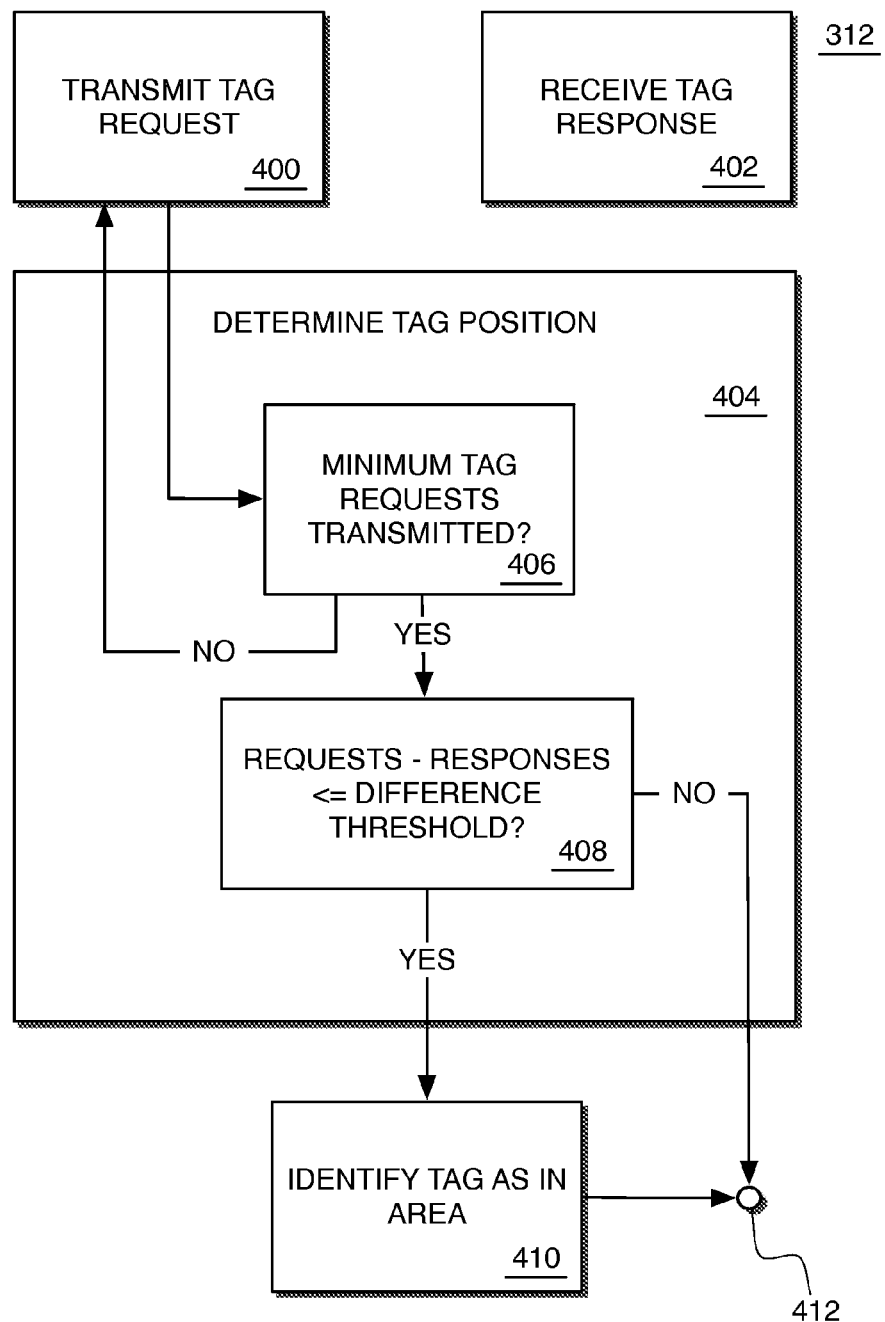
FIG. 4 is a high-level functional process flow diagram of operation of a tag detection system according to an embodiment.

FIG. 4 depicts a high-level functional process flow diagram of operation of TDS 312 according to an embodiment. For simplicity and ease of understanding, the following description is provided with respect to a single tag receiving and responding to TMS 100. Additional and/or alternative process flows and data structures may be used with respect to more than one tag.

The process flow begins at a transmit tag request functionality 400 wherein processor 300, executing a set of instructions, causes antenna 102 to transmit one or more tag requests and increment transmitted count 316. Also, during execution of TDS 312 by processor 300, and more specifically receive tag response functionality 402, the processor increments received count 318 for each received tag response. In at least some embodiments, functionality 402 may be performed concurrently with other functionality of TDS 312.

In at least one embodiment, receive tag response functionality 402 may be performed serially after tag request functionality 400.

The flow proceeds to a determine tag position functionality 404, specifically to a minimum request transmission functionality 406 wherein processor 300, executing a set of instructions, compares transmitted count 316 to minimum transmission count 320 to determine if a predetermined minimum number of tag requests have been transmitted.

If the result of minimum request transmission functionality 406 determination is negative ("NO"), then the flow returns to transmit tag request functionality 400 and processor 300 causes antenna 102 to transmit another tag request. If the result of the functionality 406 determination is positive ("YES"), then the flow proceeds to difference threshold comparison functionality 408 wherein processor 300, executing a set of instructions, compares the difference between transmitted count 316 and received count 318 with difference threshold 314.

If the result of difference threshold comparison functionality 408 is negative ("NO"), the flow proceeds to complete execution of TDS 312 at node 412. If the result of threshold comparison functionality 408 is positive ("YES"), the flow proceeds to identify functionality 410 wherein processor 300, executing a set of instructions, identifies the tag generating the tag responses as a tag within a predetermined area, e.g., an area near antenna 102. The flow then proceeds to complete node 412. In this manner, tags which respond more than a predetermined minimum number of times are determined to be near the antenna and tags not responding the predetermined minimum number of times are determined to be NOI tags.

In at least some embodiments, TMS 100 may store a received tag response identifier in memory 302 corresponding to a tag 104 determined to be in the predetermined area. In at least some embodiments, TMS 100 may store a received tag response identifier in memory 302 corresponding to a NOI tag 202. In at least some embodiments, TMS 100 may store both tags determined to be of interest and NOI tags in memory 302.

In at least some embodiments, difference threshold comparison functionality 408 may operate using a difference threshold 314 which is a percentage value.

Figure 5:
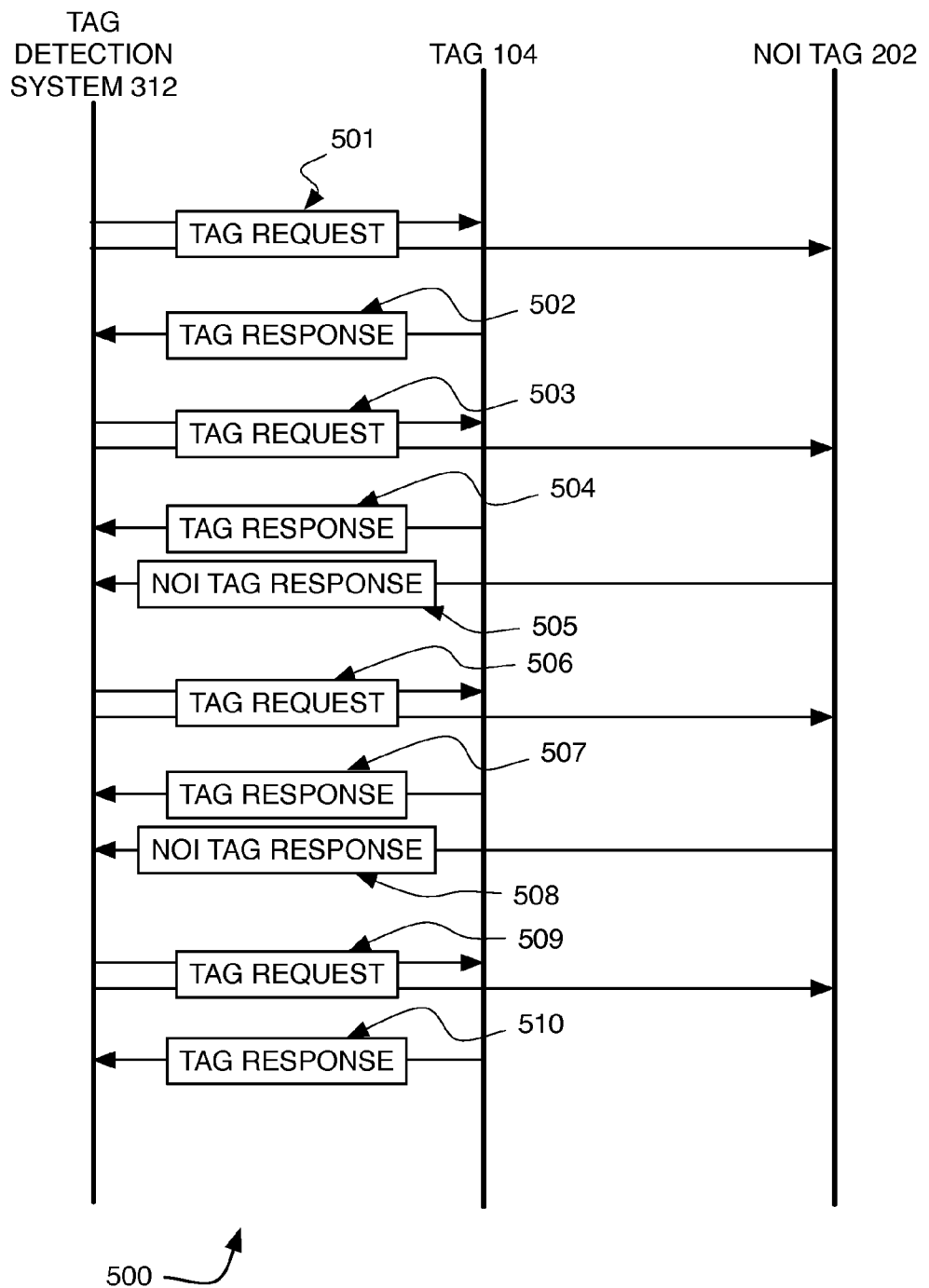
FIG. 5 is a sequence flow diagram according to an embodiment.

FIG. 5 depicts a sequence flow diagram of an interaction 500 between TDS 312 and tag 104 and NOI tag 202 according to an embodiment. Time proceeds downward along the page toward the bottom. TDS 312 transmits a tag request 501 to tag 104 and NOI tag 202. Because tag 104 is moving across the field of view of antenna 102, tag 104 transmits a tag response 502 to TDS 312 in reply. NOI tag 202 fails to transmit a tag response either due to: lack of receipt of tag request 501 or lack of ability to transmit a signal to TDS 312 which is recognizable as a tag response.

TDS 312 transmits a second tag request 503 to tag 104 and NOI tag 202. Again, tag 104 transmits a tag response 504. However, due to one of the above-identified factors, e.g., in-phase signal strength combination, NOI tag 202 transmits a tag response 505 to TDS 312. TDS 312 transmits a third tag request 506 to tag 104 and NOI tag 202. Again, tag 104 transmits a tag response 507. However, due to one of the above-identified factors, e.g., in-phase signal strength combination, NOI tag 202 transmits a tag response 508 to TDS 312.

Finally, TDS 312 transmits a tag request 509 to tag 104 and NOI tag 202 and tag 104 transmits a tag response thereto. Tag 104 has transmitted a tag response to each tag request and NOI tag 202 has transmitted two tag responses to the four tag requests.

Figure 6:
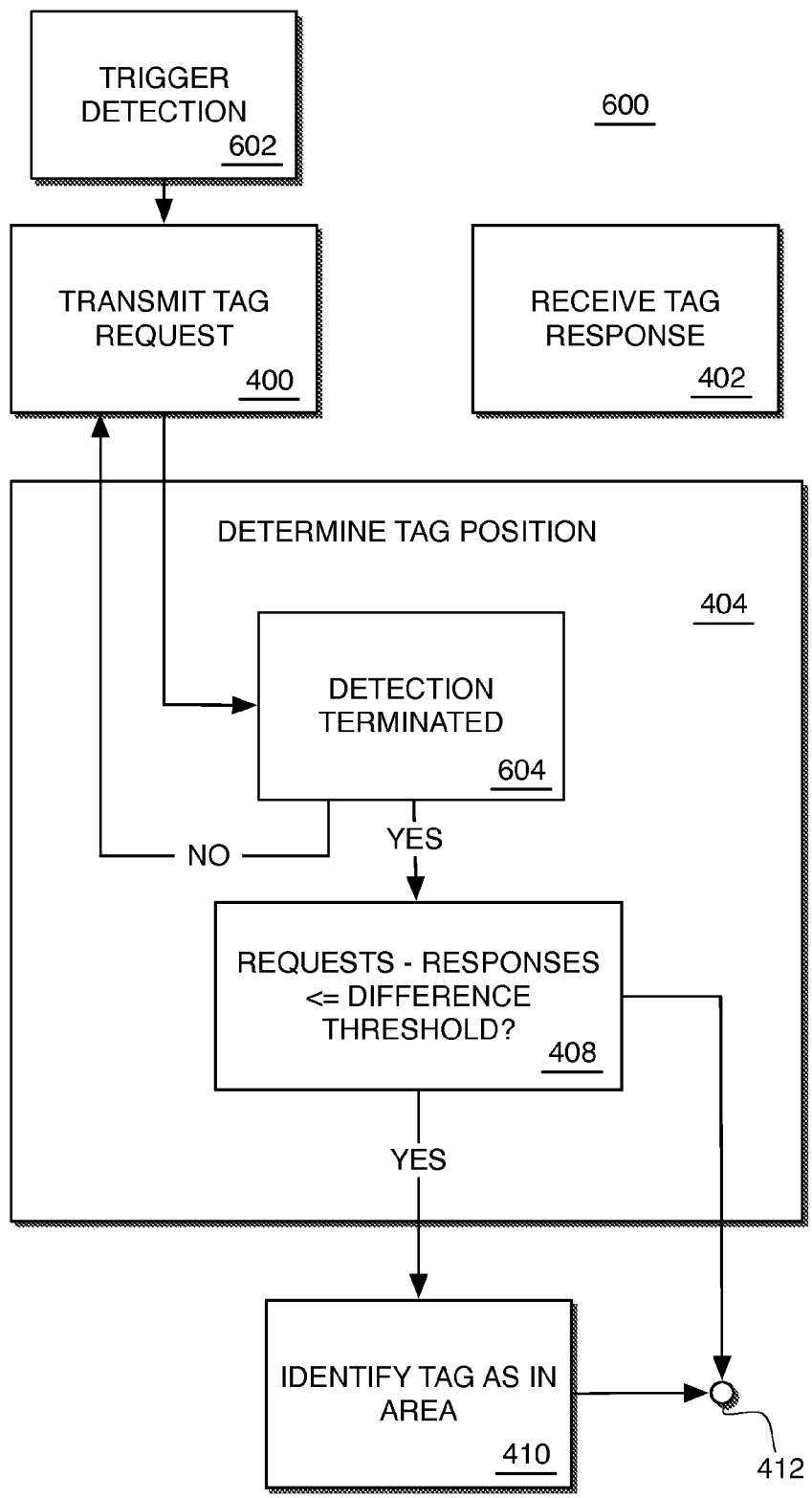
FIG. 6 is a high-level functional process flow diagram according to another embodiment.

FIG. 6 depicts a high-level functional process flow diagram of operation 600 of TDS 312 according to another embodiment wherein the TMS 100 comprises a switch to trigger operation. The process flow begins at trigger detection functionality 602 wherein operation of TMS 100 begins based on a predetermined trigger event occurring, e.g., physical and/or signal based activation of a switch. The flow then proceeds as in FIG. 4 with the exception that functionality 406 is replaced with detection terminated functionality 604 wherein tag detection is terminated based on either a predetermined timeout interval being exceeded and/or activation of another switch by, for example, vehicle 108.

What is claimed is:

1. An RFID tag detection method comprising:
   transmitting, in a predetermined area, a predetermined number of RFID tag request signals;
   determining that an RFID tag is positioned within the predetermined area based on a comparison of a count of zero or more received RFID tag response signals from the RFID tag with the predetermined number of RFID tag request signals, wherein a RFID tag response signal consists of a single identifier unique with respect to other RFID tags positioned within the predetermined area, and wherein the determining step comprises reading the single, unique identifier;
   repeating the determining step at the predetermined location for each unique RFID tag from which an RFID tag response signal is received, wherein repeating the determining step is based solely on the comparison; and
   storing a count of the unique RFID tags determined to be positioned within the predetermined area.

2. The method of claim 1, comprising:
   receiving zero or more RFID tag response signals in response to the transmitted RFID tag request signals.

3. The method of claim 1, wherein the comparison comprises:
   determining that the count of RFID tag response signals differs from the predetermined number of RFID tag request signals by a predetermined request-response difference threshold.

4. The method of claim 3, wherein the predetermined request-response difference threshold is zero.

5. The method of claim 3, wherein the predetermined request-response difference threshold is one or more.

6. The method of claim 3, wherein the predetermined request-response difference threshold is based on a percentage of the predetermined number of RFID tag request signals transmitted.

7. The method of claim 1, further comprising:
   storing an RFID tag identifier corresponding to each unique RFID tag determined to be positioned within the predetermined area.

8. An RFID tag detection system comprising:
   an antenna arranged to transmit a tag request and receive a tag response;
   a memory comprising a set of executable instructions; and
   a processor communicatively coupled with the memory and the antenna and arranged to execute one or more instructions of the set of executable instructions, execution of the one or more instructions by the processor causes the processor to cause the antenna to transmit a predetermined number of RFID tag requests and to determine that an RFID tag is either a not of interest tag based on receipt of RFID tag responses from the RFID tag less than the predetermined number of RFID tag requests transmitted or a tag of interest, wherein a RFID tag response consists of a single identifier unique with respect to other RFID tags positioned within the predetermined area, and wherein the determination comprises reading the single, unique identifier, and to repeat the determination at the predetermined location for each unique RFID tag from which an RFID tag response signal is received, wherein the repeated determination is based solely on the comparison, and to store a count of the unique RFID tags determined to be positioned within the predetermined area.

9. The system as claimed in claim 8, wherein the processor, executing the one or more instructions determines than an RFID tag is a tag of interest if the number of tag responses received from the RFID tag corresponds to the predetermined number of RFID tag requests transmitted.

10. The system as claimed in claim 8, wherein the processor, executing the one or more instructions stores an indication in the memory than an RFID tag is a tag of interest.

11. The system as claimed in claim 8, wherein the processor, executing the one or more instructions causes the antenna to transmit the predetermined number of RFID tag requests in a predetermined area.

12. The system as claimed in claim 11, wherein the processor executing the one or more instructions determines than an RFID tag is within the predetermined area if the number of tag responses received from the RFID tag corresponds to the predetermined number of RFID tag requests transmitted.

13. A memory storing instructions which, when executed by a processor, cause the processor to transmit, in a predetermined area, a predetermined number of RFID tag requests and determine that an RFID tag is positioned within the predetermined area based on comparing a count of zero of more received RFID tag responses from the RFID tag with the predetermined number of RFID tag requests transmitted, wherein a RFID tag response consists of a single identifier unique with respect to other RFID tags positioned within the predetermined area, and wherein the determination comprises reading the single, unique identifier, and to repeat the determination at the predetermined location for each unique RFID tag from which an RFID tag response signal is received, wherein the repeated determination is based solely on the count comparison, and to store a count of the unique RFID tags determined to be positioned within the predetermined area.

14. The memory as claimed in claim 13, wherein the comparing comprises instructions which, when executed by the processor, cause the processor to determine whether the count of RFID tag response signals differs from the predetermined number of RFID tag request signals by a predetermined request-response difference threshold.

15. The memory as claimed in claim 14, wherein the predetermined request-response difference threshold is one or more.

16. The memory as claimed in claim 14, wherein the predetermined request-response difference threshold is based on a percentage of the predetermined number of RFID tag request signals transmitted.

17. The memory as claimed in claim 13, comprising instructions which, when executed by the processor, cause the processor to store an RFID tag identifier corresponding to each unique RFID tag determined to be positioned within the predetermined area.

18. The memory as claimed in claim 13, comprising instructions which, when executed by the processor, cause the processor to transmit the RFID tag requests responsive to detection of a triggering event.

* * * * *